Patented Dec. 26, 1922.

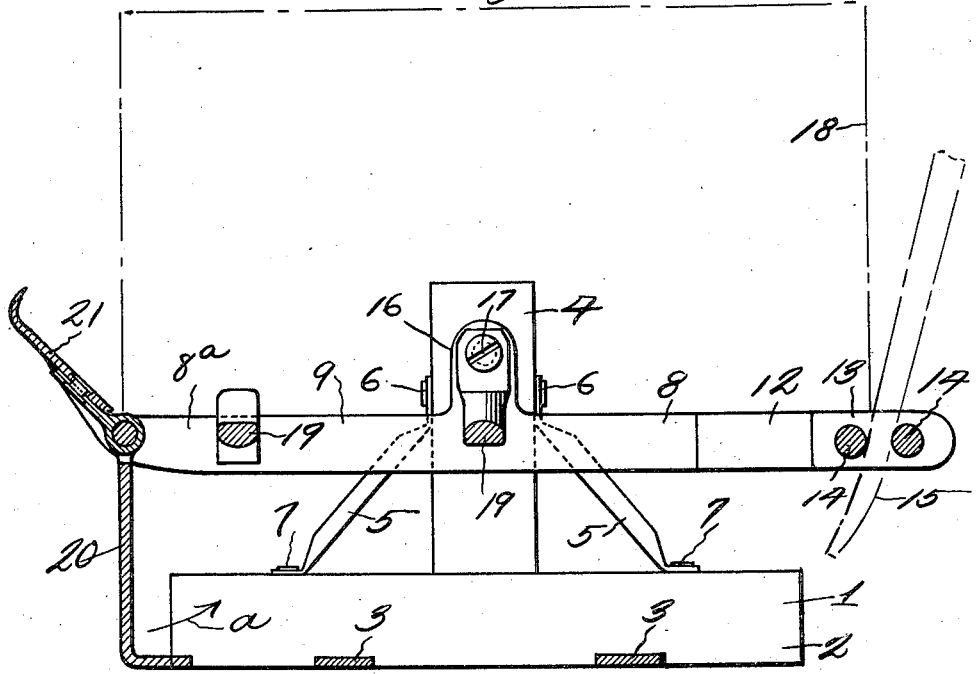
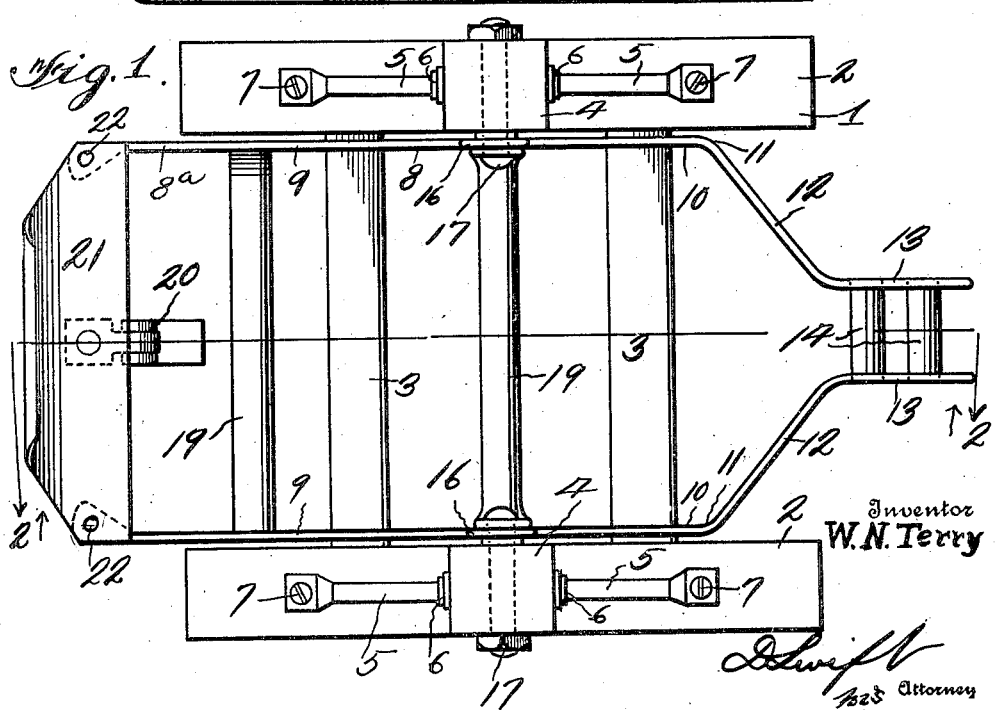

1,440,117

UNITED STATES PATENT OFFICE.

WILLIAM N. TERRY, OF FREEPORT, ILLINOIS.

BARREL STAND.

Application filed November 1, 1921. Serial No. 512,023.

*To all whom it may concern:*

Be it known that I, WILLIAM N. TERRY, a citizen of the United States, residing at Freeport, in the county of Stephenson, State of Illinois, have invented a new and useful Barrel Stand; and I do hereby declare the following to be a full, clear, and exact description of the invention, such as will enable others skilled in the art to which it appertains to make and use the same.

The invention relates to barrel stands, and has for its object to provide a device of this character comprising a base having a tiltable frame therein one end of which may be placed in engagement with the ground when a barrel is being placed thereon and the frame tilted for supporting the barrel spaced from ground and in a horizontal position, thereby allowing liquid to be drawn from the barrel. Also to provide a tiltable frame with a pivoted leg, which leg moves to a vertical position during a tilting operation, and is so positioned that when the tiltable frame is substantially horizontally disposed, said leg will move to a substantially vertical position, and hold the tiltable frame in a horizontal position.

A further object is to provide the tiltable frame with upwardly extending arms, the upper ends of which are pivoted to upwardly extending arms carried by the base.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the barrel stand.

Figure 2 is a vertical longitudinal sectional view taken on line 2—2 of Figure 1.

Referring to the drawings, the numeral 1 designates the base of the stand, which base comprises spaced bars 2 in parallel relation to each other, which bars are connected togeteher by means of transversely disposed bars 3. Extending upwardly from the spaced bars 2 are arms 4, which arms are rigidly braced by means of braces 5, the upper ends of which are secured at 6 to opposite sides of the arms 4, and the lower ends secured at 7 to the spaced bars 2. It will be seen that a rigid base 1 is formed, which base may be disposed on the ground. Disposed between the upwardly extending arms 4 is a frame 8, on which frame a barrel is adapted to be disposed and held in a horizontal position. The frame 8 comprises the side members 9, which are parallel with each other and have their ends 10 bent at 11 to form inwardly extending members 12 which terminate in longitudinally disposed portions 13 in parallel relation to each other, which portions are connected together by rods 14. The rods 14 are spaced from each other, thereby allowing a bar 15 to be inserted between the rods during a tilting operation of the tiltable frame 8. Extending upwardly from the sides 9 of the frame 8 are arms 16, which arms are pivotally mounted on the bolts 17, which extend through the upwardly extending arms 4 of the base 1. It will be seen that the pivotal point of the frame 8 is above the main body of the frame, therefore the frame is an underslung one, and when the barrel 18 is disposed on the cross bars 19 of the frame 8, the frame will assume a position according to the center of gravity of the barrel and frame. However the end $8^a$ of the frame 8 is preferably heavier so that when the pivoted supporting leg 20 is moved inwardly in the direction of the arrow $a$, the barrel receiving plate 21, which is secured at 22 to the ends of the bars 9 will move downwardly into engagement with the ground, thereby allowing the barrel 18 to be positioned on the plate in such a manner that when the frame 8 is tilted, said barrel will assume the position shown in Figure 2. As the frame 8 is tilted through the medium of the bar 15, the pivoted supporting leg 20 will move to the vertical position shown in Figure 2 and hold the tiltable frame 8 in substantially a horizontal position as shown in Figure 2, at which time fluid within the barrel will easily flow therefrom when a spigot is applied thereto.

From the above it will be seen that a tiltable barrel stand is provided, which is simple in construction and one wherein a barrel may be easily and quickly tilted. The device is particularly adapted for use in connection with oil barrels, however it may be used in connection with other types of barrels.

The invention having been set forth what is claimed as new and useful is:—

A tiltable barrel stand, said stand comprising a base, a barrel receiving frame pivoted in said base, said frame having its pivots above the main body of the frame, an outwardly and upwardly extending ground engaging plate carried by one end of the pivoted barrel receiving frame, the outer end of the ground engaging plate being provided with an inwardly extending curved flange adapted to engage over the chine of a barrel, a supporting leg pivoted to the angularly disposed ground engaging plate and so proportioned that after the pivoted frame has been moved to substantially a horizontal position, it will support the frame in its horizontal position and spaced member carried adjacent the other end of the pivoted frame for the reception of a bar whereby the pivoted frame may be easily tilted to horizontal position.

In testimony whereof I have signed my name to this specification in the presence of two subscribing witnesses.

WILLIAM N. TERRY.

Witnesses:
 W. L. ICKES,
 O. K. DAWSON.